Figure 1:
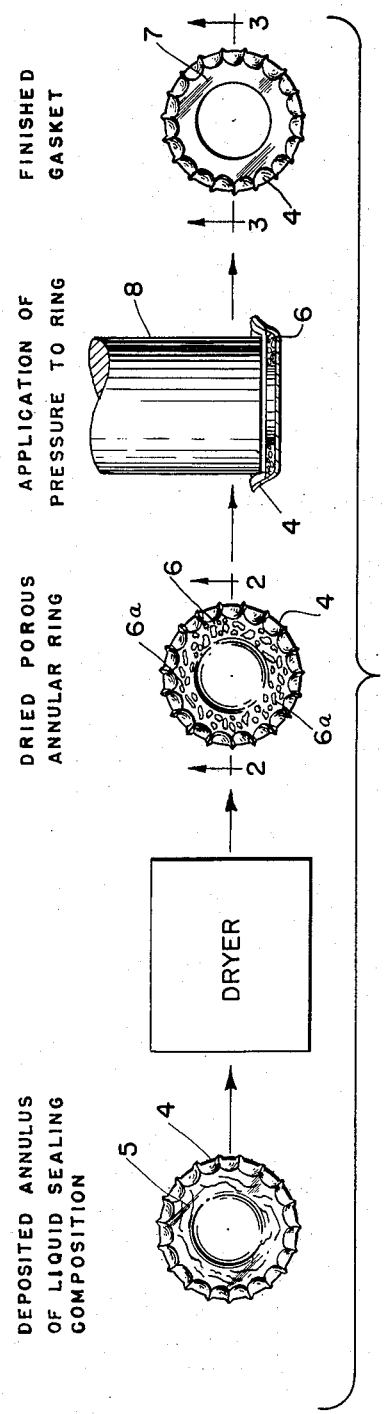

Jan. 21, 1964    J. D. NAGLE ET AL    3,118,783
METHOD OF PRODUCING GASKETS OF ELASTOMERIC
POLYMERS FOR CONTAINER CLOSURES
Filed May 9, 1962

3,118,783
METHOD OF PRODUCING GASKETS OF ELASTOMERIC POLYMERS FOR CONTAINER CLOSURES
John D. Nagle, Belmont, and Charles W. Simons, Bedford, Mass., assignors to W. R. Grace & Co., Cambridge, Mass., a corporation of Connecticut
Filed May 9, 1962, Ser. No. 193,628
12 Claims. (Cl. 117—43)

This invention relates to the formation of sealing gaskets for container closures, and more particularly to gaskets for metal or plastic caps which are to be applied to glass jars and bottles.

A large proportion of container closures are provided with rubbery gaskets which have been deposited on the closures in the form of liquid gasketing composition and then solidified. While the rubbery gaskets so formed give generally satisfactory sealing performance, they also have certain drawbacks both in the method of their application and in the characteristics of the finished gaskets.

The gaskets used in caps and similar removable container closures must be quite thick in order to do an adequate sealing job. Consequently, a heavy layer of liquid sealing composition must be deposited on the closure and then converted to solid form. The liquid compositions used for the production of such gaskets have been for the most part either water dispersions of suitable elastomers or plastisol compositions. In a few cases, heavy, dough-like mixtures of rubber, filler and a rubber solvent have been used. The water-based compositions require a substantial time for drying, often 60 to 90 minutes, during which time the soaps and other stabilizing ingredients in the composition tend to migrate toward and concentrate at the interface between the gasket and the closure, frequently destroying adhesion between the gasket and the closure. Solvent-based compositions ordinarily require an even longer drying time, two hours or more representing a normal drying cycle for gaskets of this type. As a consequence, the use of solvent-based compositions for this purpose has been severely limited. Plastisol compositions require a relatively short time for cure or heat-setting, but the range of materials which may be used in such compositions is, of course, very narrow.

Recent developments in the technology of producing and handling elastomeric polymers have made possible the production of solutions and dispersions of elastomers in organic liquid vehicles which, except for the above-described lengthy drying time, would be ideal for use as liquid gasketing compositions and would yield gaskets of superior sealing ability and excellent adhesion to the container closure. Substitution of these materials for water-based or plastisol compositions would give greater latitude in the selection of elastomers and fillers, in many cases making it possible to use elastomers of lower cost or those having special properties such as a high degree of resistance to the action of oils and solvents.

It is an object of our invention, therefore, to develop a method by which the highly desirable organic liquid-base container sealing compositions may be used to form gaskets on caps and other removable container closures. More particularly, our invention has for its object the development of a method by which organic liquid-based compositions may be dried in a relatively short period of time to give high quality gaskets having excellent sealing characteristics. A still further object of the invention is the provision of a method for applying gaskets which will be rapid and economical and will allow the formation of gaskets having the exact contours and placement desired for the requirements of a given sealing job.

We have discovered that a dimensionally accurate gasket having good adhesion to a container closure may be made by depositing on the closure an annulus of a liquid gasketing composition comprising an elastomeric polymer in an organic liquid vehicle, removing the organic liquid from the liquid composition in a period of not more than ten minutes, leaving behind on the closure a ring of elastomeric polymer containing a multiplicity of interconnected cells and having an open, porous surface, and thereafter applying pressure to the polymer ring to collapse the cells and form a compressed essentially solid, coherent gasket of the desired shape and dimensions.

Figure 3:
Figure 2:
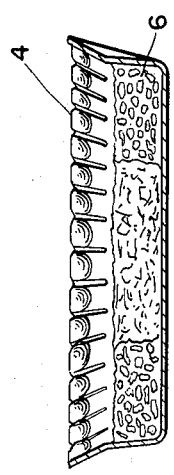

In the accompanying drawing, FIGURE 1 is a diagrammatic view illustrating the successive steps of preparing a gasketed crown cap. FIGURE 2 is a cross-sectional view taken on line 2—2 of FIGURE 1 showing the porous dried sealing composition on an enlarged scale. FIGURE 3 is a cross-sectional view taken on line 3—3 of FIGURE 1 showing the finished gasket after compression of the porous composition.

According to the process of our invention, an organic liquid-based liquid container sealing composition 5 containing an elastomeric polymer in either solution or dispersion in the organic liquid vehicle is deposited on a cap 4, home canning lid or other container closure and the organic liquid is rapidly expelled from the composition. The drying may be accomplished by subjecting the closure to an elevated temperature, for example between 150° and 400° F. Alternatively, the liquid sealing composition may be held under pressure at a temperature above the boiling point of the organic liquid vehicle until the composition is deposited on the closure. In this case, the sudden release of pressure causes the organic liquid vehicle to evaporate instantaneously or "flash off". The dried gasket material 6 which is left behind on the container closure at the completion of the quick drying step is not a solid mass, but has a coarse, open porous structure containing a large number of interconnected cells 6a and a pervious, open surface through which the organic liquid has been driven. This material is not an acceptable gasket. It is weak and spongy and gives poor sealing performance. In addition, the open-celled mass is far more subject to oxidative degradation than would be a solid gasket or one in which the surface is protected by a continuous, impermeable skin. The unacceptable spongy mass is then converted into an essentially solid, coherent gasket 7 by the application of pressure, as for example by passing the container closure under a die 8 which compresses the mass and at the same time imparts to the gasket 7 the desired shape and dimensions.

It is indeed surprising that an organic liquid-based sealing composition can be dried in a period of ten minutes or less, in view of the lengthy drying cycles necessary in the prior art. It is even more unexpected that the liquid vehicle of the composition can be driven off so rapidly without complete disruption and consequent spoilage of the gasket. Apparently, at the very rapid drying rate of our invention, the formation of the continuous skin or film which ordinarily seals the surface of a solvent-based elastomer composition and makes drying a difficult and lengthy process is not able to take place. The constantly escaping vapors keep the surface open and pervious. As a result the gasket, although it may be quite badly blistered, is not completely blown apart as might have been expected, and may be consolidated into a substantially solid mass by the application of pressure. The extremely rapid drying which we are able to achieve by our invention makes possible substantial savings in time, labor and the cost of applying gaskets to container closures.

The compression step is a most essential feature of our invention, since it makes possible the rapid drying of compositions which would otherwise require a very lengthy drying period. In addition, not only does the compression step convert the weak, spongy gasket which results from the quick drying step into a solid material of good sealing properties but it makes possible the production of a gasket of the exact contours which may be desirable for a given sealing job, a result which is ordinarily most difficult to achieve with flowed-in sealing gaskets. The gasket may, for example, have a perfectly flat sealing surface or it may, if desired, be provided with a bead at either its inside or outside peripheral edge. The gaskets of our invention, furthermore, have such a high degree of dimensional stability that they are able to maintain indefinitely the exact configuration imposed by the reshaping step. Placement of the gasket may also be determined during the compression step. As a result of the exact shaping and placement of the gasket during the compression step, it is even possible to obtain good sealing with an amount of gasketing material substantially less than that ordinarily used. Compression of the gasket must be carried out as a separate step, prior to the application of the closure to a container. The compressive force exerted by the lip of the container is not sufficient and does not cover a wide enough area of the gasket to be in any sense a substitute for the compression step of our invention.

The drying step may be carried out at any temperature which will produce substantial puffing in the compound and will also prevent the formation of a continuous skin or film over the surface of the composition. We have found that in general, temperatures in the range between about 150° F. and about 400° F. are suitable. At these temperatures, the gaskets ordinarily used for sealing glass jars and bottles, which are about 0.060 inch thick in their puffed state, will dry in from one to three minutes. Gaskets for use on pail covers, however, are much thicker, about 0.300 inch, and will require from five to ten minutes. On the other hand, the very thin gaskets sometimes used for special sealing jobs, about 0.020 inch thick, may dry in as little as 30 seconds. The thickness of the metal or other material from which the container closure is made will also have some influence on the speed of drying, and consequently must be taken into account in determining the temperature at which the gaskets are dried. Drying is preferably carried out in an oven of the type described in United States Patent No. 2,610,131, in which heated, high velocity air is passed over the material to be dried.

The alternative method of drying, by flashing off the solvent as the liquid gasketing composition is applied to the container closure, makes it possible to eliminate or greatly reduce the application of heat to the container closure with its deposited annulus of gasketing material. This method, therefore, is of particular value when the container closures are made from plastics or other materials which are damaged by exposure to elevated temperatures. This embodiment of the invention may be carried out by using an organic liquid vehicle of very low boiling point, i.e. one which is normally gaseous at room temperature, for example butadiene, isobutylene or propane. The preparation and storage of such a liquid gasketing composition takes place under pressure sufficient to maintain the vehicle in its liquid state. When the liquid composition is applied to the closure, as by discharge from the nozzle of a lining machine, the sudden release from the pressurized condition allows the organic liquid vehicle of the composition to boil off, or flash off, so quickly that an open cellular structure results in the dried gasket.

A further alternative involves heating a gasketing composition based on a normally liquid organic material to a temperature above the boiling point of the organic liquid prior to its deposition on the container closure. This may be accomplished, for example, by pumping the composition through a heat exchanger while holding it under sufficient pressure to maintain it in the liquid state. In this case, also, deposition of the composition on the container closure is accomplished by very rapid removal of the liquid vehicle, leaving behind on the container closure a dried gasket having an open cellular structure. The flash drying step will normally be found to dry the gasket completely. If, however, minor amounts of the organic vehicle remain in the gasket, they may be removed by heating the container closure for a suitable short period of time.

The step of reshaping the gasket may be carried out at any pressure which is capable of disrupting the spongy structure and impressing the desired final shape on the gasket. The range of pressures which may be used may easily be determined by any person skilled in the art and therefore does not form a part of the invention. Likewise, the temperature at which the reshaping is done is a matter of convenience and choice, although for many purposes it is preferable to work at or only slightly above room temperature in order to avoid damage to the protective coating or lacquer on the container closure.

The liquid gasketing composition used in carrying out the process of our invention may be either a solution or a dispersion of an elastomeric polymer or polymer mixture in a suitable organic liquid medium, or if desired it may be a combination solution-dispersion such as that described in United States Patent No. 2,593,681. The organic liquid medium may be selected from a wide range of organic liquids, the choice being controlled by such factors as the solubility of the elastomeric polymer or polymer mixture in the liquid, as well as the boiling point, toxicity, availability and cost of the organic liquid itself. Suitable materials for use as the liquid medium for the gasketing compositions are, for example, toluene, benzol, pentane, hexane, heptane, octane and the various aliphatic alcohols. Lower boiling materials, as for example hetadiene, isobutylene and propane, may be used in the specific embodiment of the invention described above.

The elastomeric polymer may also be choosen from a wide range of materials, depending particularly on the characteristics which are desired in the sealing gasket. Natural rubber may be used, for example, or any of the large group of synthetic elastomeric polymers such as the butadiene-styrene copolymers, butadiene-acrylonitrile copolymers, butadiene-styrene-acrylonitrile terpolymers, polychloroprene (neoprene), polysulfide rubber (Thiokol), butyl rubber, plasticized vinyl chloride polymers and copolymers and the like. Mixtures of the various elastomers may also be used, if desired, to give special properties to the liquid gasketing composition or to the finished gasket. The elastomers may be cured while in the liquid gasketing composition or after its deposition and drying on the container closure. It is important to avoid too much cure of the gasket material before the compression step, however, so that the material will possess the necessary compressibility and coherence to form a solid gasket under compression.

The solution or dispersion of elastomeric polymer in organic liquid may be modified in various ways to facilitate the drying and compression steps, to impart the desired properties to the finished gasket and to reduce the cost of the material. For example, mineral fillers such as zinc oxide, calcium carbonate, barytes, talc, clay and the like may be added to the liquid composition. The presence of fillers helps to prevent the formation of an impermeable skin or film over the surface of the composition during drying, thus assisting the escape of the organic liquid from the composition. In addition, fillers also reduce the tackiness of the dried gaskets and prevent the compressed gasket from adhering to the die or other pressure tool used in the compression step. Fillers may also be used to give greater bulk and specific sealing characteristics to the finished gaskets, as is well known in the container sealing art. Gums, resins, vulcanizing agents, antioxidants and the like may also be added to the liquid compositions as desired.

Our invention will be more clearly understood by reference to the following examples, in which all parts are by weight.

*Example I*

A filler mixture was made by stirring 16 grams of a wet-ground Georgia clay ("Buca" clay) and 16 grams of zinc oxide into 10 grams of toluene and 40 grams of a 50 percent solution of ester gum in hexane, until the fillers were thoroughly dispersed. 100 grams of a 32 percent latex of a 52.5–31–16.5 percent butadiene-styrene-acrylonitrile terpolymer were mixed with 21 grams of a 38.6 percent latex of a 50–50 butadiene-styrene copolymer, and added to the filler dispersion. The mixture was stirred together for about 10 minutes, after which coagulation was effected by adding 100 grams of ethyl alcohol. A soft solid coagulum was precipitated out and was separated from the aqueous phase, which also contained the alcohol. An additional amount of 80 grams of hexane was stirred into the soft coagulum. The result was a very fine-grained, stable dispersion of the two elastomeric polymers and the fillers in the toluene-hexane mixture.

The composition was deposited in the channel of a series of home canning jar lids, which were dried in an oven for one minute at a temperature of 375° F. The dried material was highly puffed, containing a large number of interconnected cells and having an open, pervious surface. It was weak and spongy and was in no way suitable for use as a sealing gasket.

The cellular mass was then compacted under a pressure of about 50 pounds per square inch by placing one lid on top of another and squeezing them together. The gaskets compacted in this way were smooth, substantially solid, coherent and had the appearance of gaskets dried under conventional conditions for at least two hours. When subjected to a standard home canning test, they were found to perform in a very satisfactory manner, developing and holding an excellent vacuum.

*Example II*

A 75–25 butadiene-styrene copolymer (33 parts) and a 50–50 butadiene-styrene copolymer (11 parts), were milled together with 40 parts of zinc oxide on a conventional rubber mill for 20 minutes, until the rubbers were thoroughly mixed and somewhat softened. The rubber mixture was then transferred to a Werner-Pfleiderer mixer and 100 parts of hexane was added in small increments, with sufficient time between additions for the hexane to be completely absorbed. Working was continued after all the hexane had been added until a smooth, creamy, fine-grained dispersion resulted. The dispersion was further compounded by the addition of 22 parts of a terpene resin, 134 parts of calcium carbonate, 6 parts of ethyl alcohol and 54 parts of hexane.

The liquid gasketing composition so prepared, which contained the 75–25 butadiene-styrene copolymer in solution and the 50–50 butadiene-styrene copolymer in dispersion in the organic liquid medium, was deposited in the channels of a series of home canning lids as in the previous example. The lids were subjected to a temperature of 375° F. for one minute, which time was sufficient to puff and dry the gasketing composition. The puffed material was compressed as in Example I and gave excellent results when tested in a standard home canning procedure.

*Example III*

400 grams of a 70–30 butadiene-styrene copolymer were milled together with 80 grams of hydrogenated resin and 1600 grams of calcium carbonate and the mixture was dissolved in toluene to give a solution having a total solids of 43.4 percent. The liquid composition was deposited in the channels of a series of metal caps, which were subjected to a temperature of 355° F. for 2 minutes. The compound puffed severely during drying and was so badly blistered that it was not at all suitable for use as a sealing gasket. When the puffed compound was compressed as in the above examples, however, it formed a solid, coherent gasket of acceptable sealing properties.

*Example IV*

The process of Example III was followed, using 100 parts of butyl rubber (isobutylene copolymerized with a minor amount of isoprene), 400 parts of calcium carbonate, 10 parts of hydrogenated rosin, and 255 parts of hexane. The compound was lined, dried, and compressed as in Example III to give an acceptable solid sealing gasket.

Gaskets made according to the above examples, although dried in the extremely short time of one to two minutes, were converted by the compression step into strong, coherent solid gaskets of very desirable sealing properties. The compression step could be used, in addition, to impart the exact size and configuration, as well as placement, to the gasket.

We claim:

1. A method of making a gasket for a container closure which includes the essential steps of applying to the closure an annulus of a fluid comprising an elastomeric polymer in a volatile organic liquid vehicle, evaporating the organic liquid from the said annulus in not more than 10 minutes, leaving behind on the closure a ring of elastomeric polymer containing a multiplicity of interconnected cells and having an open, porous surface, and thereafter compressing said polymer ring to collapse the cells and form an essentially solid coherent gasket of the desired configuration, the step of compressing the gasket being carried out prior to the application of the closure to a container.

2. The method of claim 1 in which the said fluid comprises a dispersion of an elastomeric polymer in an organic liquid.

3. The method of claim 1 in which the said fluid comprises a solvent solution of an elastomeric polymer.

4. The method of claim 1 in which the said elastomeric polymer is selected from the group consisting of natural rubber, butadiene-styrene copolymers, butadiene-acrylonitrile copolymers, butadiene-styrene-acrylonitrile terpolymers, polychloroprene, polysulfide rubber, butyl rubber, plasticized vinyl chloride polymers and copolymers and mixtures thereof.

5. The method of claim 1 in which the organic liquid is evaporated by heating the said annulus to a temperature of between 150° and 400° F.

6. The method of claim 1 in which the said fluid comprises a dispersion of a butadiene-styrene-acrylonitrile terpolymer and a butadiene-styrene copolymer in a mixture of hexane and toluene.

7. The method of claim 1 in which the said fluid comprises a dispersion of a hexane-insoluble butadiene-styrene copolymer in a hexane solution of a soluble butadiene-styrene copolymer.

8. The method of claim 1 in which the said fluid comprises a solution of a butadiene-styrene copolymer in toluene.

9. The method of claim 1 in which the said fluid comprises a solution of butyl rubber in hexane.

10. The method of claim 1 in which the organic liquid is flash evaporated off as the said fluid is applied to the container closure.

11. The method of claim 10 in which the said fluid comprises a solution of an elastomeric polymer in a solvent which is normally gaseous at room temperature and atmospheric pressure, said solvent being held in the liquid state under pressure prior to the application of the fluid to the container closure.

12. The method of claim 10 in which the said fluid is heated under pressure to a temperature above the boiling point of the organic liquid prior to the application of the fluid to the container closure.

References Cited in the file of this patent

UNITED STATES PATENTS

| | | |
|---|---|---|
| 1,427,133 | Taliaferro | Aug. 29, 1922 |
| 2,114,308 | McGowan et al. | Apr. 19, 1938 |
| 2,336,944 | Madge et al. | Dec. 14, 1943 |
| 2,684,774 | Aichele | July 27, 1954 |
| 2,706,183 | Carter | Apr. 12, 1955 |
| 3,032,826 | Brillinger | May 8, 1962 |
| 3,037,474 | Navikas | June 5, 1962 |

FOREIGN PATENTS

| | | |
|---|---|---|
| 615,282 | Canada | Feb. 28, 1961 |